United States Patent
Steinberg et al.

(10) Patent No.: US 7,475,630 B2
(45) Date of Patent: Jan. 13, 2009

(54) REVERSIBLE COOKING APPLIANCE

(75) Inventors: Howard I. Steinberg, Shelton, CT (US); Michelle Carillo, Norwalk, CT (US); Jill Kreutzer Orent, Westport, CT (US); David J. Wanat, Meriden, CT (US)

(73) Assignee: Conair Corporation, Stamford, CT (US)

( * ) Notice: Subject to any disclaimer, the term of this patent is extended or adjusted under 35 U.S.C. 154(b) by 17 days.

(21) Appl. No.: 10/881,693

(22) Filed: Jun. 30, 2004

(65) Prior Publication Data

US 2005/0005776 A1    Jan. 13, 2005

Related U.S. Application Data

(60) Provisional application No. 60/483,715, filed on Jun. 30, 2003.

(51) Int. Cl.
 *A47J 37/00* (2006.01)
(52) U.S. Cl. ............... 99/331; 99/337; 99/338; 99/422; 99/425; 99/445; 219/452.13
(58) Field of Classification Search ........... 99/330–333, 99/422–425, 372, 337, 338, 444–450; 219/450.1, 219/451.1, 455.11, 418.1, 468.2, 443.1, 452.13, 219/455.12, 432, 433, 438–442
See application file for complete search history.

(56) References Cited

U.S. PATENT DOCUMENTS

| | | | |
|---|---|---|---|
| 875,972 A | 1/1908 | Wessel | |
| 2,081,078 A * | 5/1937 | Watson | 126/373.1 |
| 2,597,695 A | 5/1952 | Braski et al. | 219/44 |
| 2,785,277 A | 3/1957 | Jepson | 219/44 |
| 213,763 A | 4/1979 | Lee | |
| 5,133,248 A | 7/1992 | Farnsworth et al. | |
| D338,132 S | 8/1993 | Chang | D7/356 |
| 5,355,779 A * | 10/1994 | O'Brien et al. | 99/446 |
| 5,413,032 A | 5/1995 | Bruno et al. | |
| D381,553 S | 7/1997 | Candianides | D7/356 |
| 5,839,357 A | 11/1998 | Ha et al. | 99/337 |
| 6,064,042 A * | 5/2000 | Glucksman et al. | 219/452.13 |
| 6,100,504 A | 8/2000 | Wagner | 219/432 |
| 6,283,015 B1 | 9/2001 | Kwon et al. | 99/337 |
| 6,397,730 B1 | 6/2002 | Steinbach et al. | |
| 6,740,855 B1 * | 5/2004 | DeCobert et al. | 219/506 |
| 6,849,830 B2 * | 2/2005 | Damiano et al. | 219/386 |

OTHER PUBLICATIONS

Notification of Transmittal of The International Search Report with Written Opinion of the International Searching Authority, or the Declaration dated May 11, 2005, Application No. PCT/US04/21138.

* cited by examiner

*Primary Examiner*—Timothy F. Simone
(74) *Attorney, Agent, or Firm*—Lawrence Cruz

(57) ABSTRACT

A cooking appliance is provided. The cooking appliance has a heating plate with at least one cooking surface, a heater for heating the heating plate, a support structure for supporting the heating plate, and an interface mechanism that, in response to the heating plate being positioned on the support structure in a predetermined position, is actuated to permit heating of the heater.

1 Claim, 7 Drawing Sheets

REVERSIBLE COOKING APPLIANCE

CROSS-REFERENCE TO RELATED APPLICATIONS

This application claims priority to U.S. Provisional Patent Application Ser. No. 60/483,715 filed on Jun. 30, 2003, incorporated herein by reference in its entirety.

BACKGROUND OF THE INVENTION

1. Field of the Invention

The present invention generally relates to cooking appliances. More particularly, the present invention relates to cooking appliances having more than one cooking surface.

2. Description of the Related Art

Different cooking appliances that accommodate different cooking styles are known in the art. For example, it is known to provide various cooking appliances with a flat cooking surface in order to facilitate griddling. Other types of surfaces are also known, such as a corrugated surface for grilling. Typically, the cooking surface of the different cooking appliances is permanently mounted to a base or support structure. Consequently, these conventional cooking appliances tend to be somewhat awkward and inconvenient to use and store. Efforts have been made to improve upon these conventional cooking appliances. Notwithstanding, there remains a need for an improved cooking appliance that is more effective and efficient in use and/or storage.

SUMMARY OF THE INVENTION

It is an object of the present invention to provide a cooking appliance that effectively and efficiently cooks and is conveniently stored.

It is another object of the present invention to provide a cooking appliance that has one or more two-sided heating plates with a heater therein.

It is still another object of the present invention to provide a cooking appliance having a heating plate that is reversible, having at least two different cooking surfaces.

It is yet another object of the present invention to provide a cooking appliance having one or more heating plates that are removable.

It is still yet another object of the present invention to provide a cooking appliance having one or more heating plates that are sealed or insulated to be waterproof.

It is yet still another object of the present invention to provide a cooking appliance that has a support or base for cooperating with the one or more heating plates so that the support or base directly supports the one or more heating plates.

It is even still another object of the present invention to provide a cooking appliance having at least one heating plate with a flat griddle surface in a first position and a corrugated grilling surface in a second position.

It is even yet another object of the present invention to provide a cooking appliance that minimizes the accumulation of grease on the cooking surfaces thereof during use.

It is a further object of the present invention to provide a cooking appliance that is dishwasher safe.

It is a still further object of the present invention to provide a cooking appliance that has a removable collecting tray for efficiently collecting and easily removing cooking residue.

It is a yet further object of the present invention to provide a cooking appliance that has a safety interlock cooperative with a temperature controller for preventing heating of the one or more heating plates when the one or more heating plates are not properly situated with respect to the base.

These and other objects and advantages of the present invention are achieved by a cooking appliance having at least one, preferably removable, heating plate with one or more cooking surfaces on either one or both sides thereof, and with a heater being integral therein. The at least one heating plate has a drainage system associated therewith and in cooperation with one or more collection reflectors or trays. The cooking appliance has a base or support structure cooperative with the at least one heating plate to provide support for and/or to suspend the at least one heating plate with respect to a supporting surface. The support structure receives and retains the tray(s) so that the trays can cooperate with the drainage system to collect cooking residue. Still further, the cooking appliance preferably cooperates with a controller that controls the operation thereof. The controller has an interface switch that controls the heating of the at least one heating plate.

Thus, the present invention provides for a safe, effective and efficient cooking appliance operable to accomplish a variety of different cooking operations.

BRIEF DESCRIPTION OF THE DRAWINGS

Other and further objects, advantages and features of the present invention will be understood by reference to the following specification in conjunction with the accompanying drawings, in which like reference characters denote like elements of similar structure.

DETAILED DESCRIPTION OF THE INVENTION

Figure 1:
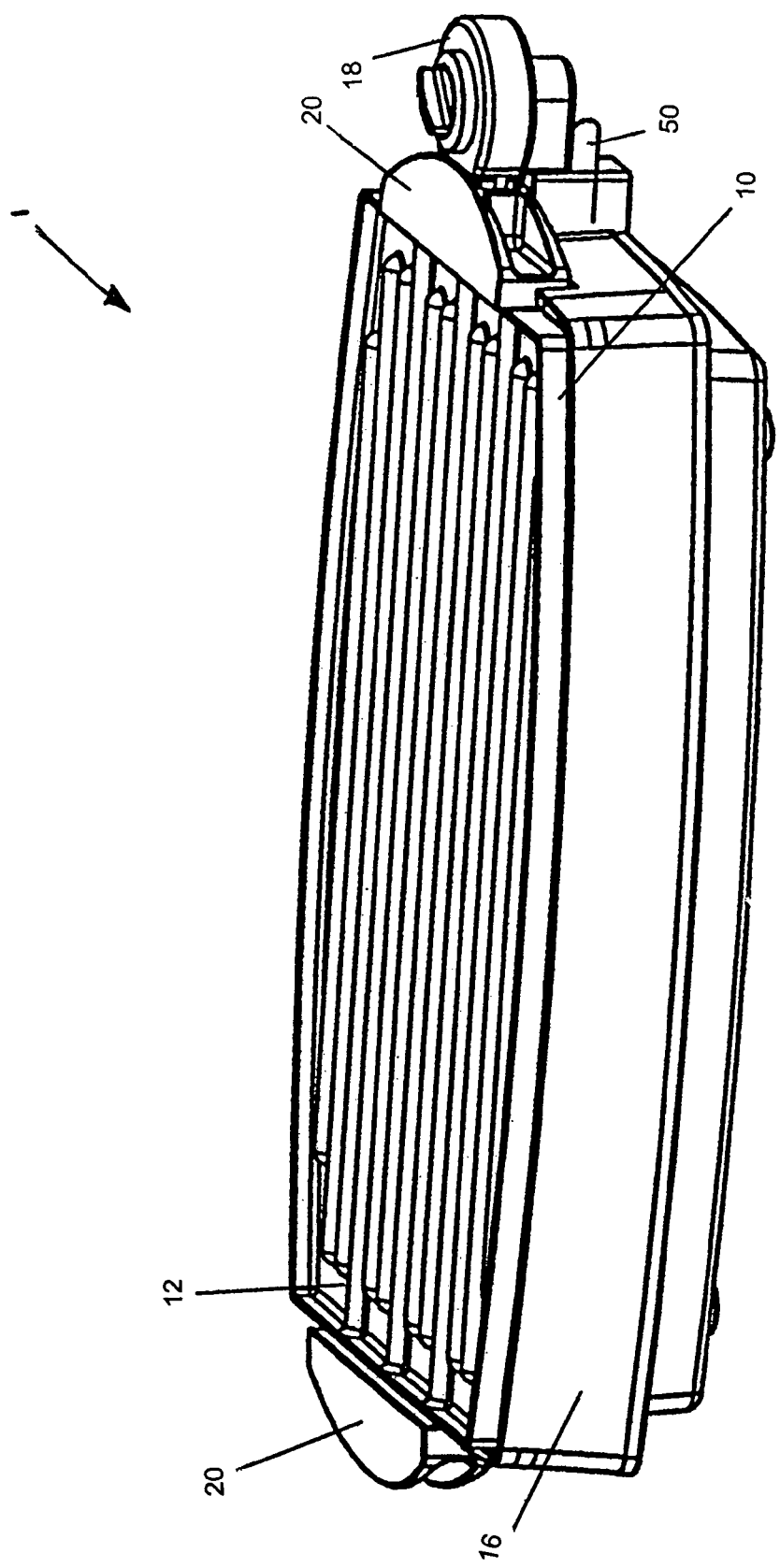
FIG. 1 is a front perspective view of an exemplary cooking appliance in accordance with the present invention.
Figure 2:
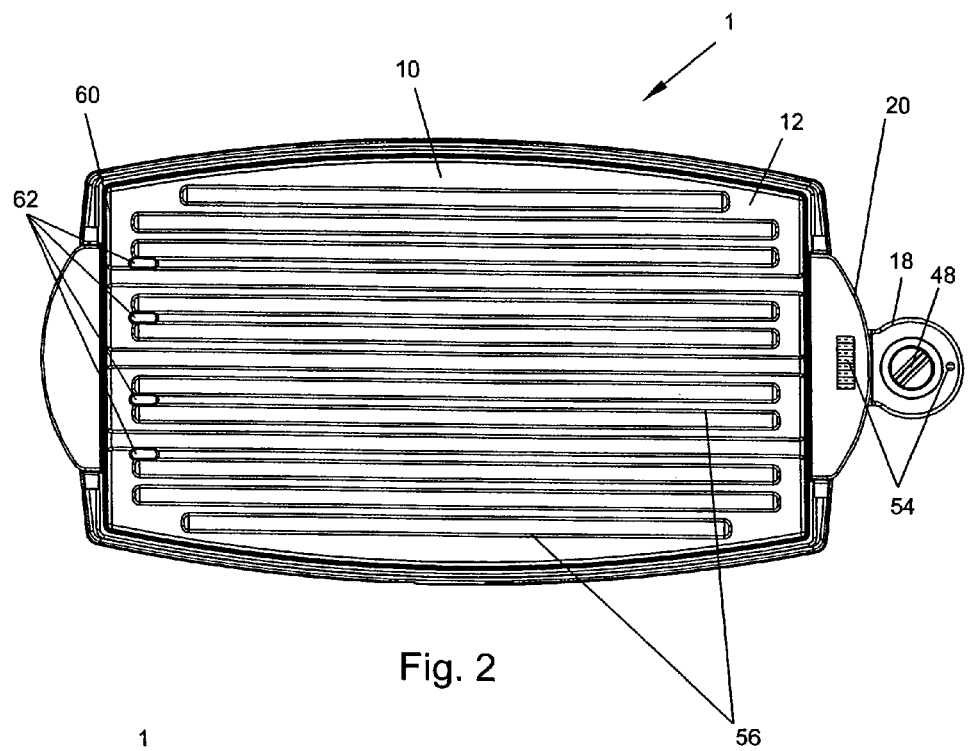
FIG. 2 is top plan view of the cooking appliance of FIG. 1.
Figure 3:
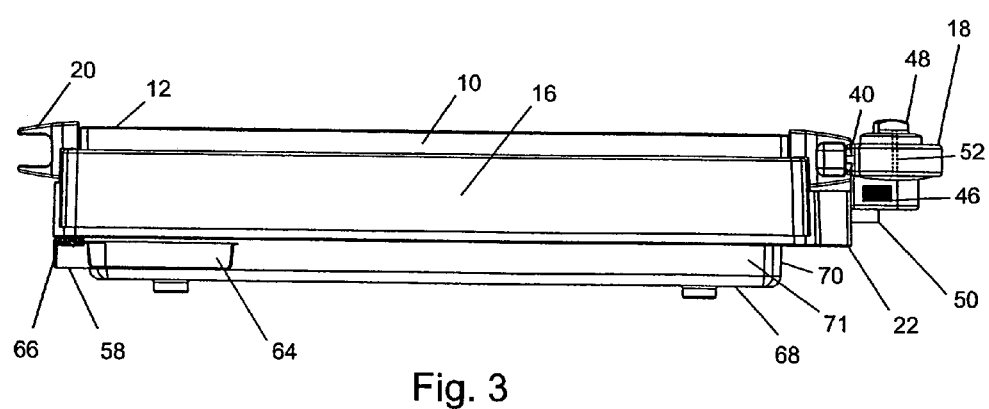
FIG. 3 is a side view of the cooking appliance of FIG. 1.
Figure 4:
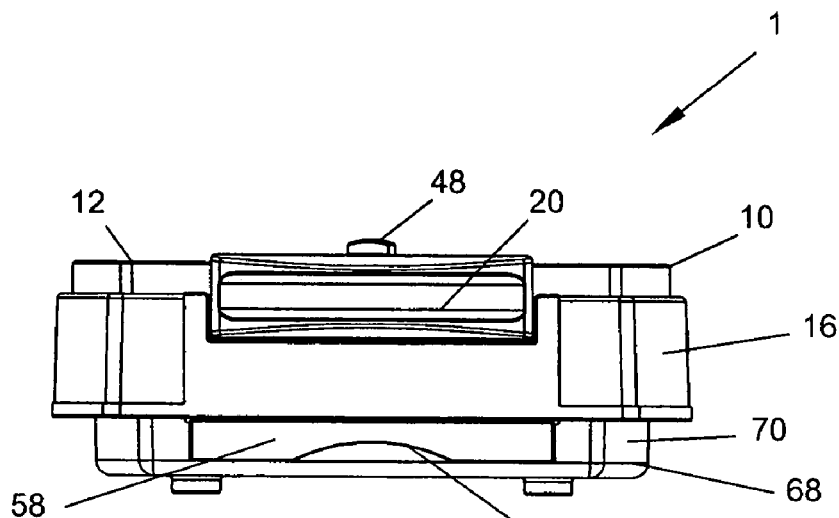
FIG. 4 is a first end view of the cooking appliance of FIG. 1.

Referring to the drawings and in particular to FIGS. 1 through 3, there is shown an illustrative embodiment of a cooking appliance generally represented by reference numeral 1. Cooking appliance 1 has at least one heating plate 10 with one or more cooking surfaces 12 on either and/or both sides thereof and a heater 14 integrally connected to the appliance. Heater 14 is clearly shown in FIGS. 6 and 7. Cooking appliance 1 preferably has a base or support structure 16 that is operatively connectable with one heating plate 10 to provide support for and/or to suspend plate 10 with respect to a supporting surface. Further, the cooking appliance 1 is operatively connectable with a controller or thermostatic control 18 that controls the operation thereof.

Heating plate 10 preferably has either and/or both sides of the heating plate with any of a number and variety of cooking surfaces 12 such as, for example, a smooth cooking surface, a ribbed or corrugated cooking surface, or waffled or grated cooking surface. Thus, cooking appliance 1 can be used for a variety of different cooking or food preparation operations depending on the orientation or positioning of heating plate 10 with respect to support structure 16,.

In one embodiment of the present invention, heating plate 10 is preferably removable and/or reversible. In this manner, any of the number and variety of heating surfaces 10 can be selectively placed on support structure 16 for cooking.

Preferably, the heating plate 10 has one or more handles 20 that are either separably connectable with or securely connected to the heating plate 10. Handles 20 facilitate the removal of heating plate 10 and/or the general manipulation thereof. Preferably, each handle 20 is formed from an insulating material, e.g. plastic, that is sufficiently strong to withstand the wear and tear associated with extended use and repeated washing of cooking appliance 1.

A variety of moldable materials are appropriate for forming handles 20. Such materials should assure that handles 20 can be gripped during use without risk of burning a user's hands. Handles 20 can have any of a variety of shapes, sizes and/or configurations suitable to facilitate easy and convenient storage of cooking appliance 1.

Figure 6:
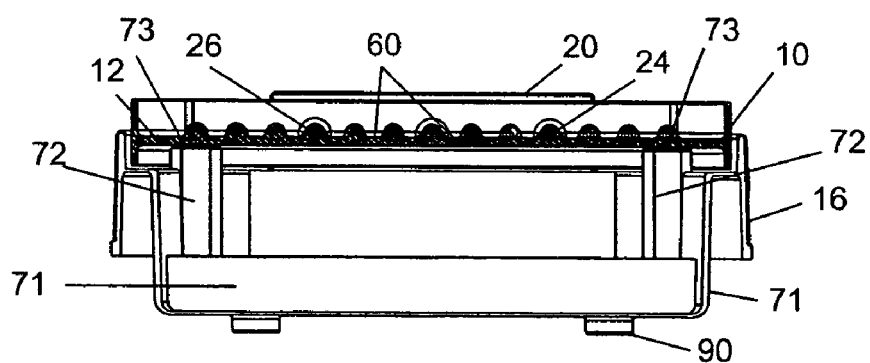
FIG. 6 is an end section view of the cooking appliance of FIG. 1.
Figure 7:
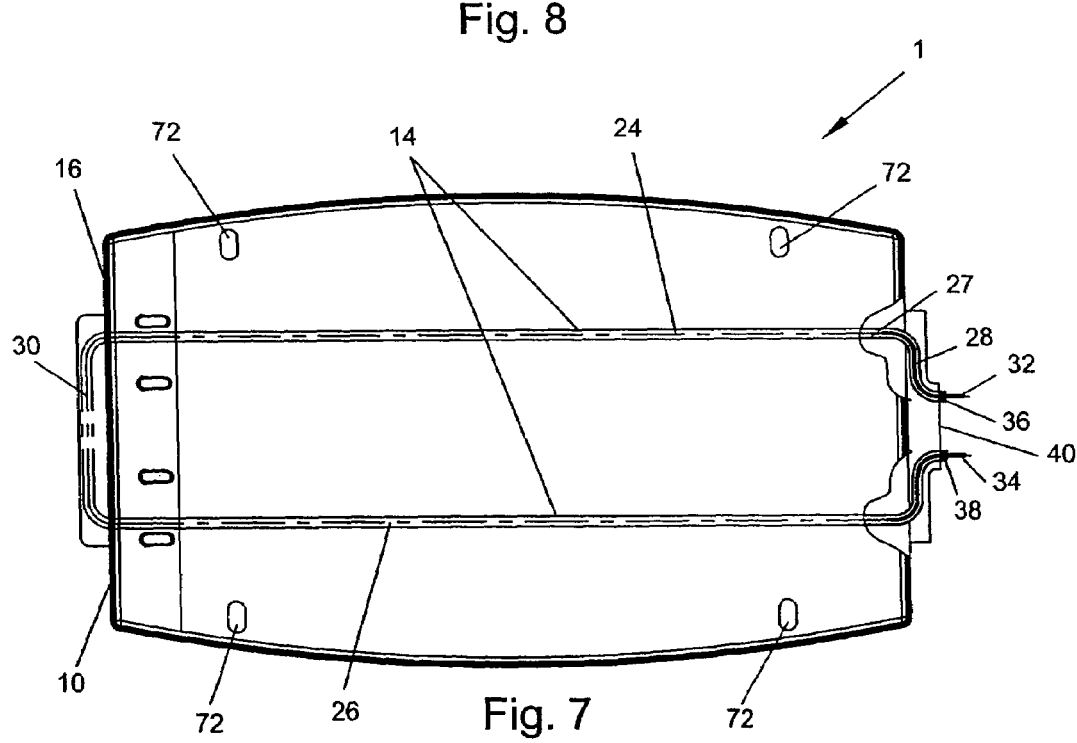
FIG. 7 is a plan section view of the cooking appliance of FIG. 1.

Heating plate 10, as noted above, preferably is formed of a heat conducting material that is cast about a heater 14, shown particularly in FIG. 7. As shown, in FIGS. 6 and 7, heater 14 preferably includes at least two laterally spaced, parallel extensions 24 and 26. Preferably, each extension 24, 26 has an inner heat conducting element 27 encased in an outer sheath 28. A similar intermediate extension 30 preferably extends between corresponding ends of the at least two laterally spaced extensions 24 and 26 to provide electrical continuity between the extensions. The heater 14 is located at an opposite end to the intermediate extension 30, preferably terminated at one or more conductive connectors 32 and 34, which preferably protrude from an end of heating plate 10. Preferably, heating plate 10 and conductive connectors 32 and 34 assure a positive seal against any water or other materials from entering the casting such as, for example, via bushings 36 and 38 associated with the conductive connectors 32 and 34.

Figure 9:
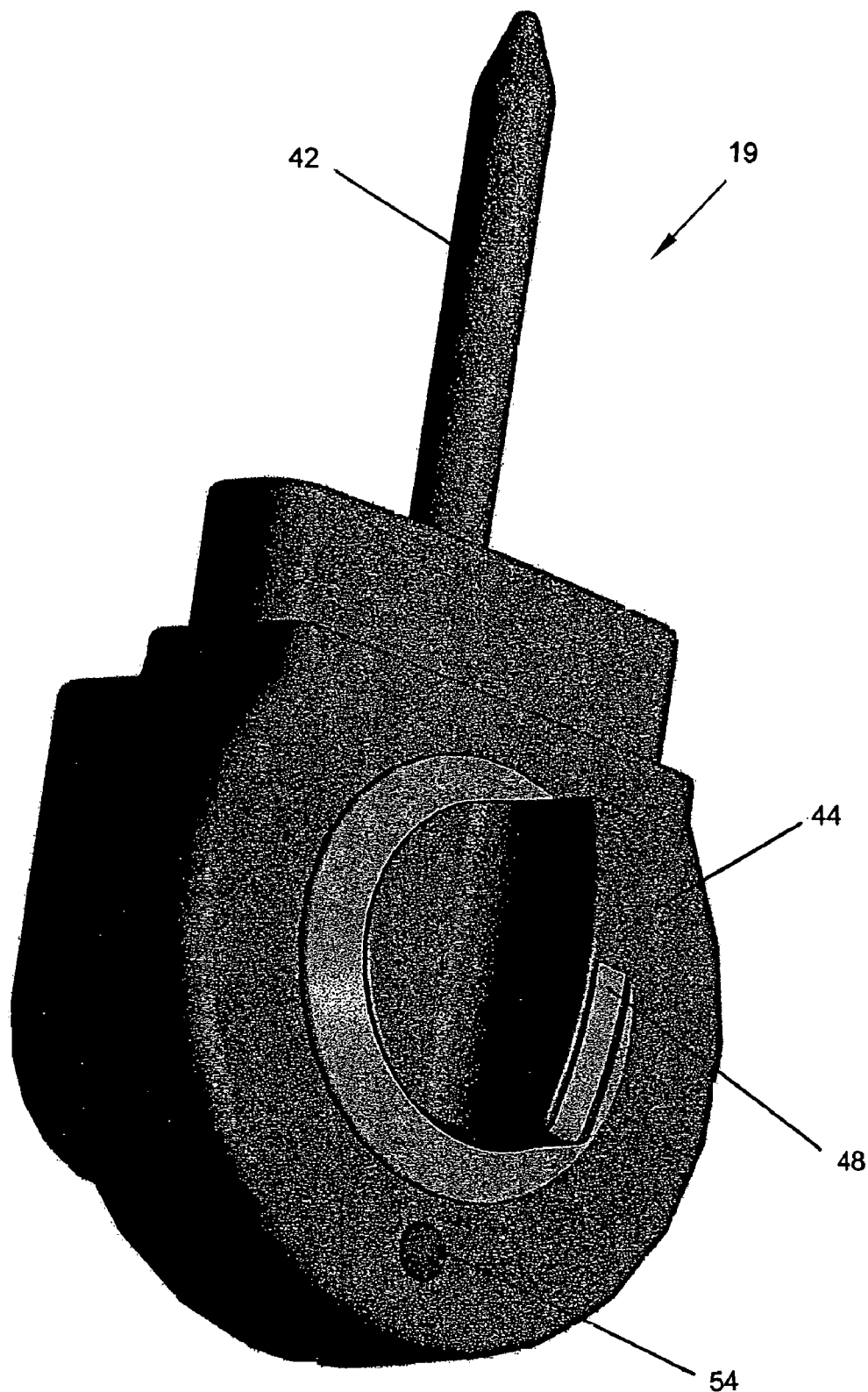
FIG. 9 is a perspective view of the exemplary controller of FIG. 5.

Preferably, at least one of handles 20 has at least one socket 40 cooperative with and/or associated with the conductive connectors 32 and 34 to receive, retain, and/or surround a separable thermostatic controller or control jack 19, shown in FIG. 9. Preferably, control jack 19 has one or more contacts 42 for conductively cooperating with conductive connectors 32 and 34.

Figure 5:
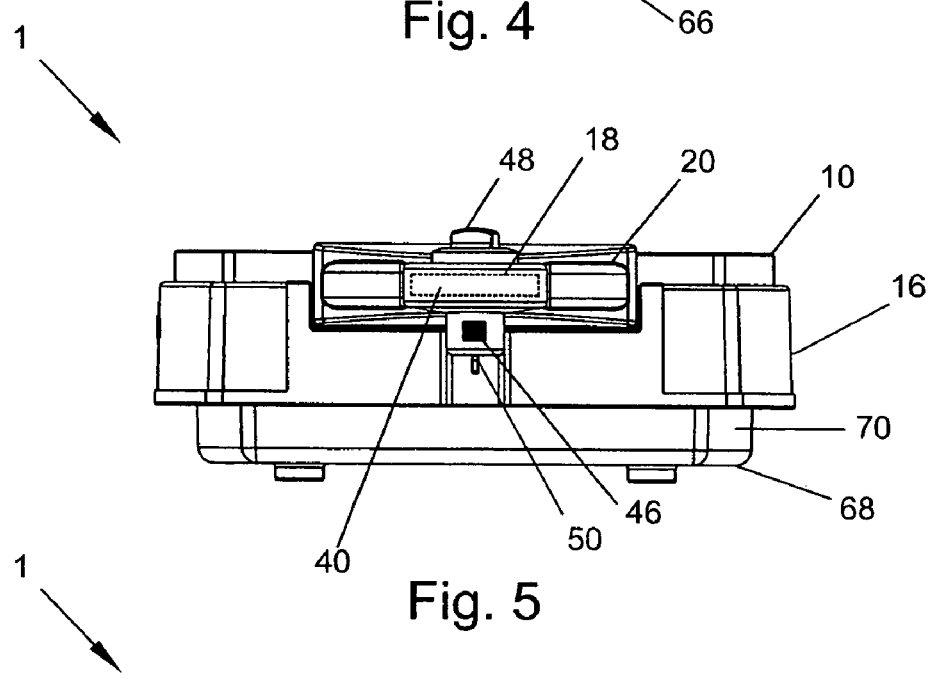
FIG. 5 is a second end view of the cooking appliance of FIG. 1, showing a controller.

Control jack 19 preferably has a housing 44 encompassing an interface control switch 46 shown in FIG. 5. Control jack 19 has a control knob 48 situated thereon in a readily accessible position. Interface switch 46 must preferably be satisfied in order for the heating plate 10 to be operative. Referring to FIG. 5, interface switch 46 preferably is cooperative with an actuator 50 associated with the support structure 16. Thus, interface switch 46 preferably prevents heating plate 10 from being heated and/or operatively used unless heating plate 10 is properly positioned on support structure 16. That is, the heating plate must be properly positioned with respect to support structure 16 so that the thermostatic control jack 19 can be operatively connected to heating plate 10, via socket 40 and actuator 50 for heating plate 10 to be operative. Actuator 50 interacts with interface switch 46 to enable power to be supplied to heating plate 10. Referring to FIG. 5, interface switch is shown interfacing with actuator 50. Interface switch 46 can be mechanical (e.g., spring biases), a circuit, an electric, electronic, electromechanical, or any other type of switch suitable to accomplish the objects of the present invention.

Referring to FIG. 9, control knob 48 preferably controls the operation of thermostatic control 18 through a rotary shaft 52. Control knob 48 can be rotatably positioned in any of a variety of preset positions corresponding to a desired operative function, such as, for example, "on", "off", "warm", "hi", "lo", and/or any other settings appropriate for cooking appliance 1.

It is noted that a light and/or an LED/LCD display 54 can be provided on housing 44, as shown in FIG. 9. Preferably, display 54 cooperates with control knob 48 to indicate or reflect the status of thermostatic control jack 19.

Control knob 48 can have any of a variety of shapes, sizes and/or configurations.

Figure 8:
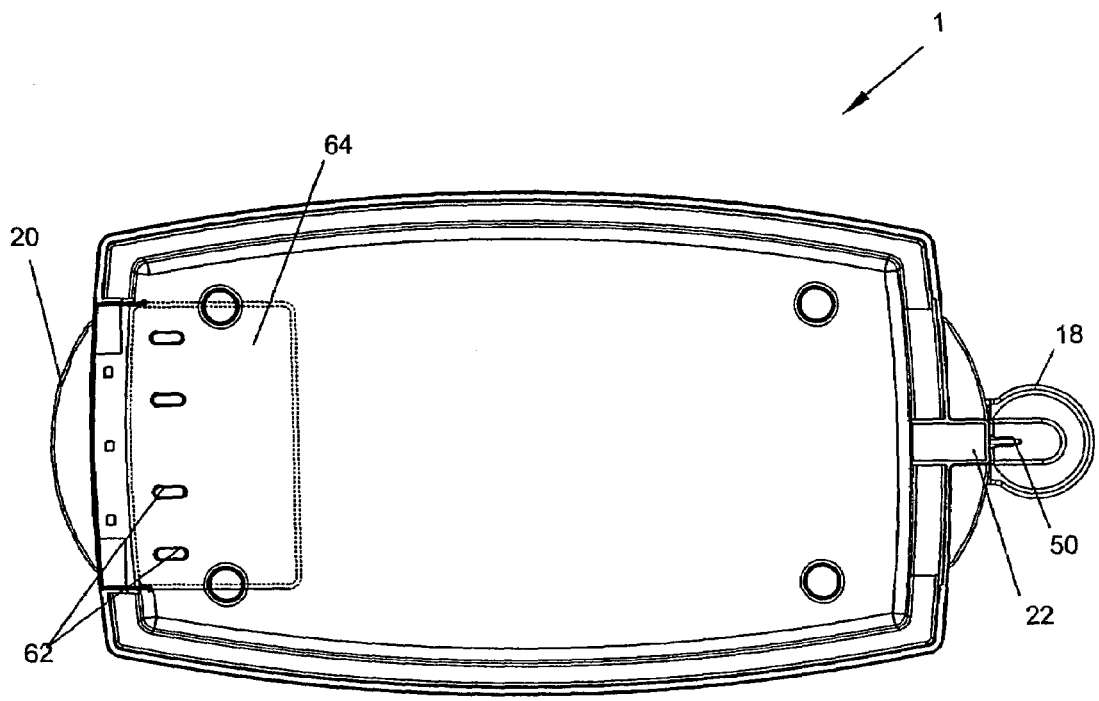
FIG. 8 is a bottom plan view of the cooking appliance of FIG. 1.

Referring to FIG. 2, heating plate 10 preferably has a drainage system 56 associated therewith. Drainage system 56 preferably cooperates with one or more collection reflectors or trays 58 associated with the support structure 16. Drainage system 56 preferably includes at least one or more drain channels 60, as shown in FIG. 6 and/or one or more drain apertures 62, as shown in FIG. 8. Preferably, drain channels 60 facilitate in transferring cooking residue such as, for example, grease or the like, to the one or more drain apertures 62, which in turn facilitate transferring the cooking residue to collection trays 58.

It is noted that the one or more drain channels 60 and/or the one or more drain apertures 62 can be associated with either and/or both sides of heating plate 10. It is also noted that at least some of the one or more drain channels 60 may be internal to heating plate 10.

It is still further noted that heating plate 10 and/or the one or more drain channels 60 can be formed to have a slope or slant associated therewith in order to improve the drainage effect via gravity.

Figure 10:
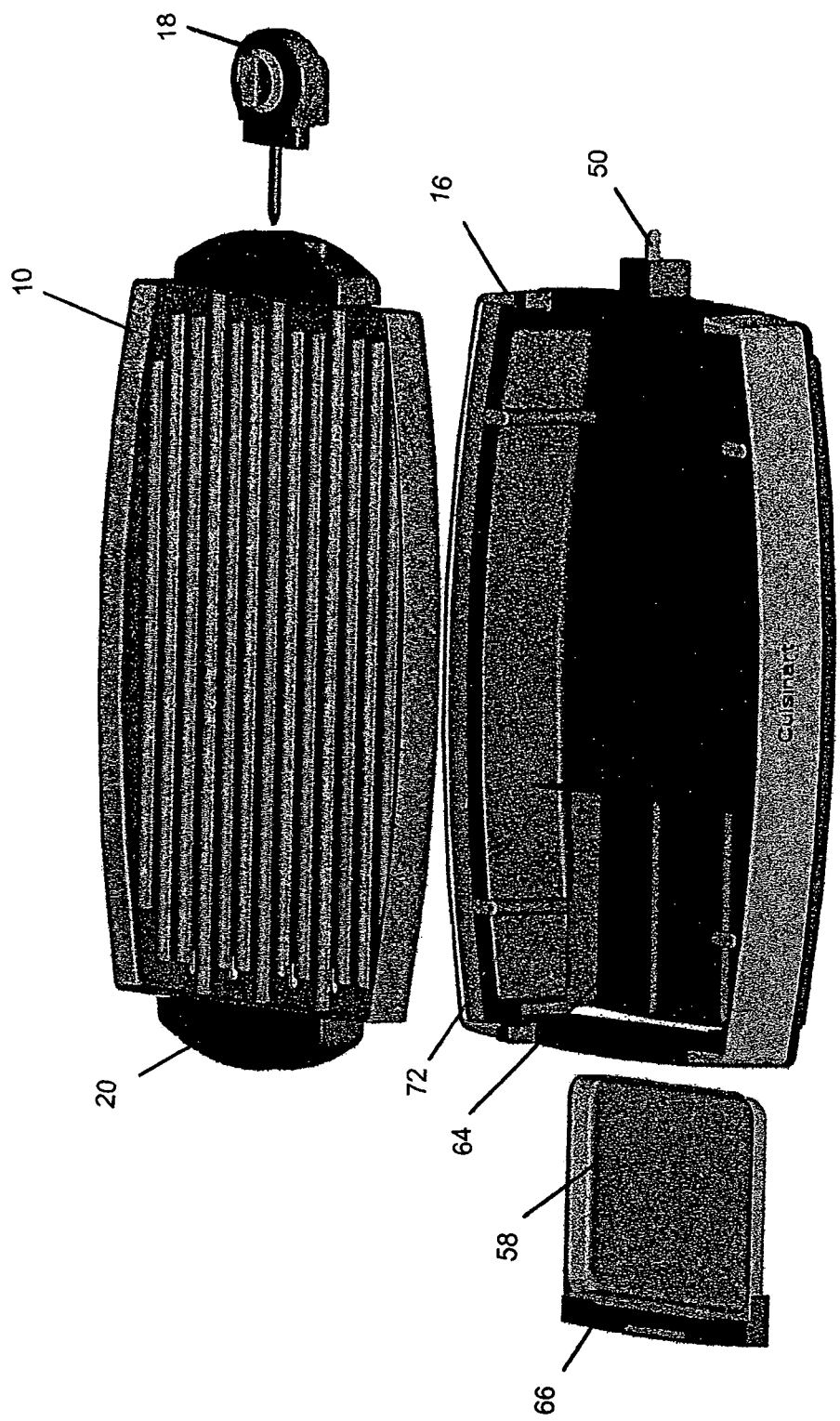
FIG. 10 is an exploded view of the cooking appliance of FIG. 1.
Figure 11:
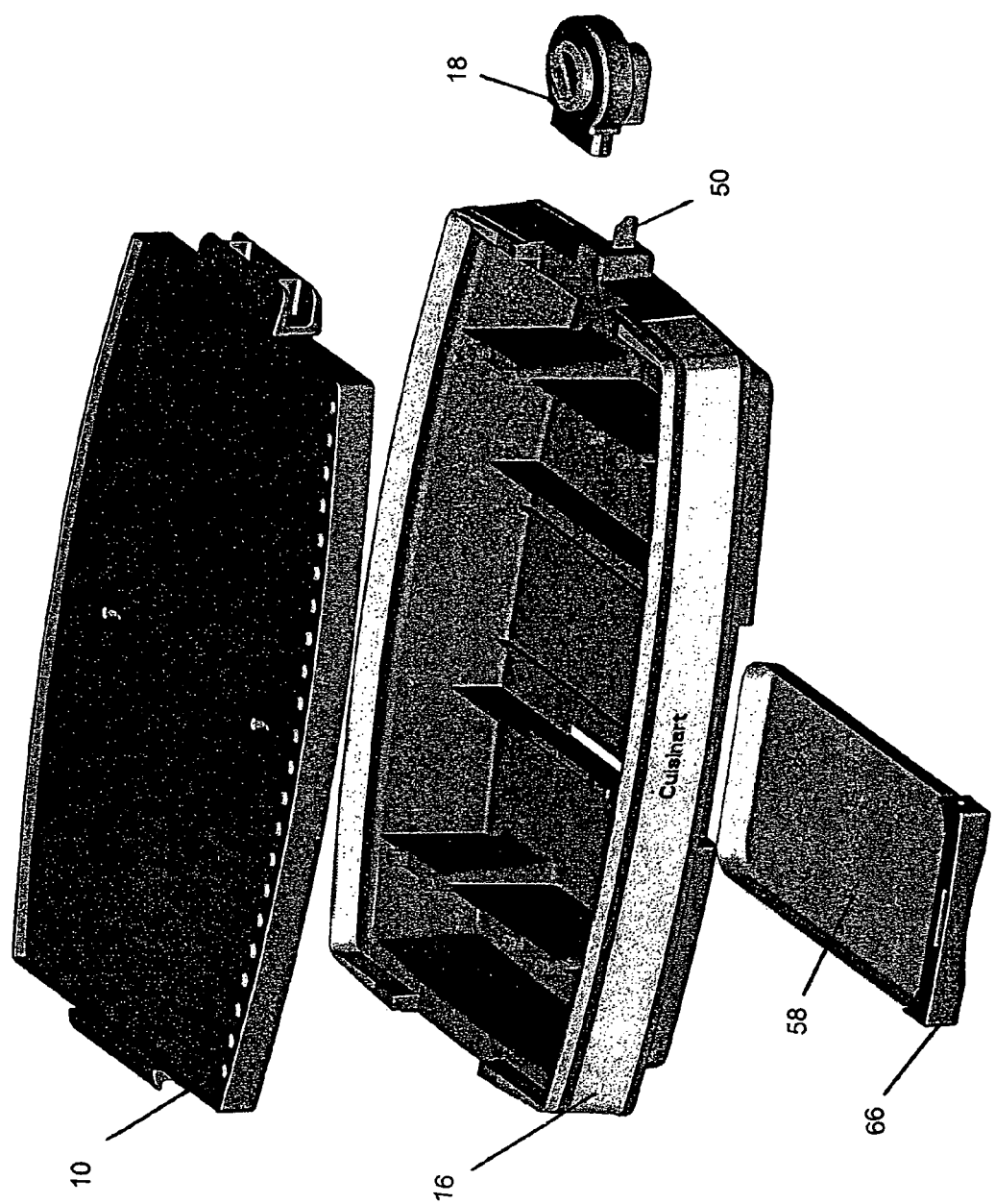
FIG. 11 is an exploded view of a cooking appliance in accordance with another illustrative embodiment of the present invention.

Referring to FIG. 10, support structure 16 is preferably capable of receiving and/or retaining the one or more trays 58 so that the trays cooperate with drainage system 56 to collect cooking residue. Support structure 16 preferably has one or more receiving compartments 64 for removably receiving and/or retaining the one or more trays 58. Preferably, the one or more trays 58 are relatively compact in size to facilitate convenient and easy removal and/or cleaning. Also preferably, the one or more trays 58 have a handle 66, as shown in FIG. 11 associated therewith to facilitate the handling or manipulation of the one or more trays 58. The support structure 16 can be fashioned with the one or more trays 58 integral therewith.

Support structure 16 can have any of a variety of configurations. For example, as shown in FIG. 3, support structure 16 can have a heat resistant floor 68 and walls 70 to form a basin 71 suitable for supporting/suspending heating plate 10. As shown in FIG. 7, support structure 16 can have one or more post-like structures 72 having heat resistant characteristics associated therewith. The one or more post-like structures 72 can have a heat resistant pad 73, as shown in FIG. 6, for contacting heating plate 10. Post-like structures 72 can be adjustable so that heating plate 10 can be adjustably elevated and/or suspended with respect to a support surface to improve the drainage effect via gravity.

Thus, the present invention provides a safe, effective and efficient cooking appliance 1 operable to accomplish a variety of different cooking operations and capable of withstanding the wear and tear associated with maintenance, cleaning and storage.

It should also be appreciated by those skilled in the art that the particular functions and other aspects of the teachings herein are but examples of the present invention, and thus do not limit the scope or variety of applications that the present invention may be suitably implemented. Thus, it should be understood that the foregoing description is only illustrative of a present implementation of the present invention. Various alternatives and modification may be devised by those skilled in the art without departing from the present invention. Accordingly, the present invention is intended to embrace all such alternatives, modifications, and variances which fall within the scope of the appended claims.

What is claimed is:

1. A cooking appliance comprising
   a base adapted to rest on a generally flat surface, said base comprising a floor and four sidewalls;
   a removable cooking plate having two cooking surfaces for transferring heat to food product place on said cooking surface;
   a heat element embedded in said cooking plate for generating heat from electrical energy and transferring said heat to said cooking surfaces;
   an electrical conductor socket adapted to plug into said cooking plate to deliver electrical energy to said appliance;
   a control dial residing on said conductor socket for controlling heat generated by said heat element; and
   a mechanical switch actuator formed as a horizontally extending member that extends outwardly from one of said sidewalls and that is adapted to activate said conductor socket to enable electrical energy to be delivered to said appliance when said socket is positioned in contact with said actuator in a predetermined position, and to disable electrical energy preventing its delivery to said appliance when said socket is positioned out of said predetermined position.

* * * * *